Oct. 25, 1960 E. F. FROMME 2,957,473
HEATER
Original Filed Feb. 16, 1954 3 Sheets-Sheet 1
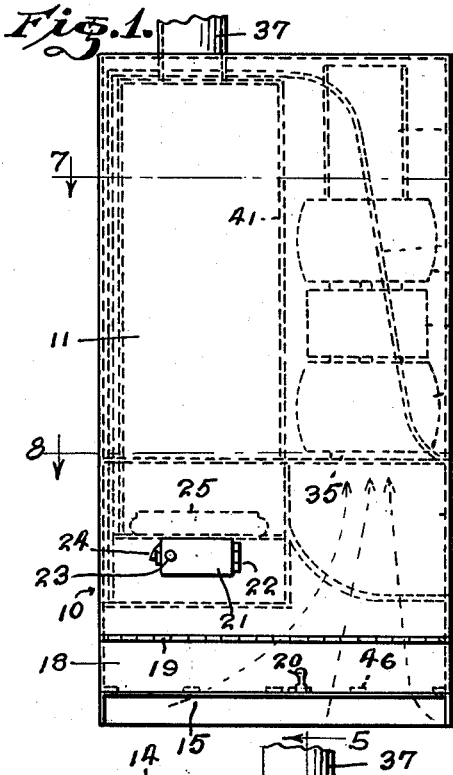
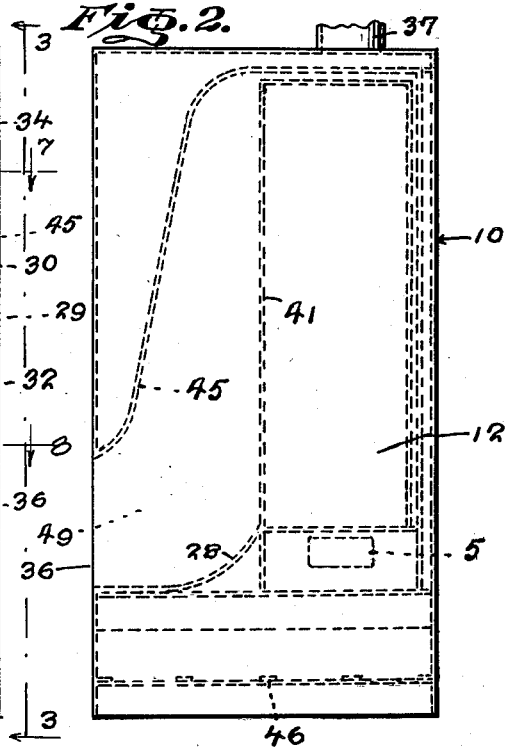
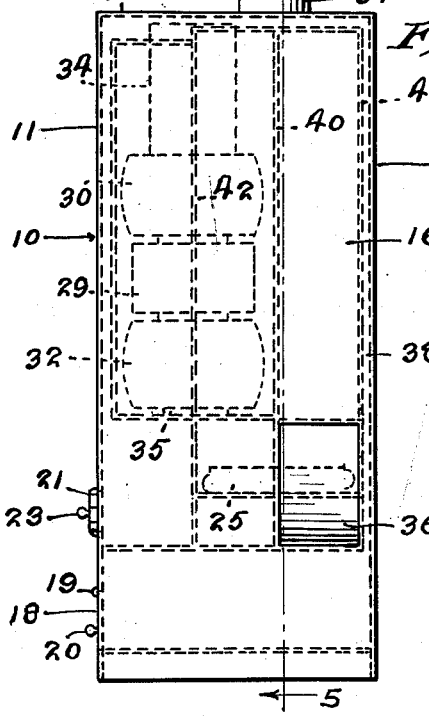
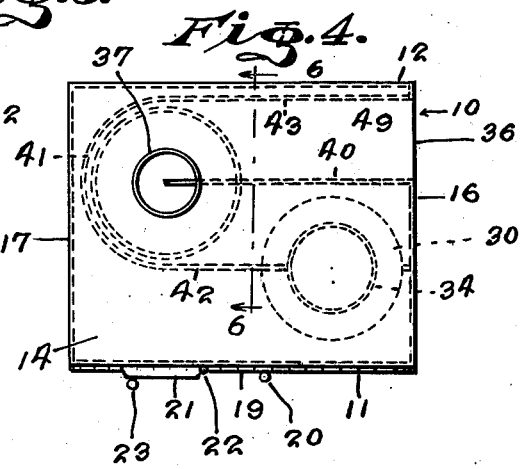
INVENTOR.
Earl F. Fromme,
BY Victor J. Evans & Co.
ATTORNEYS

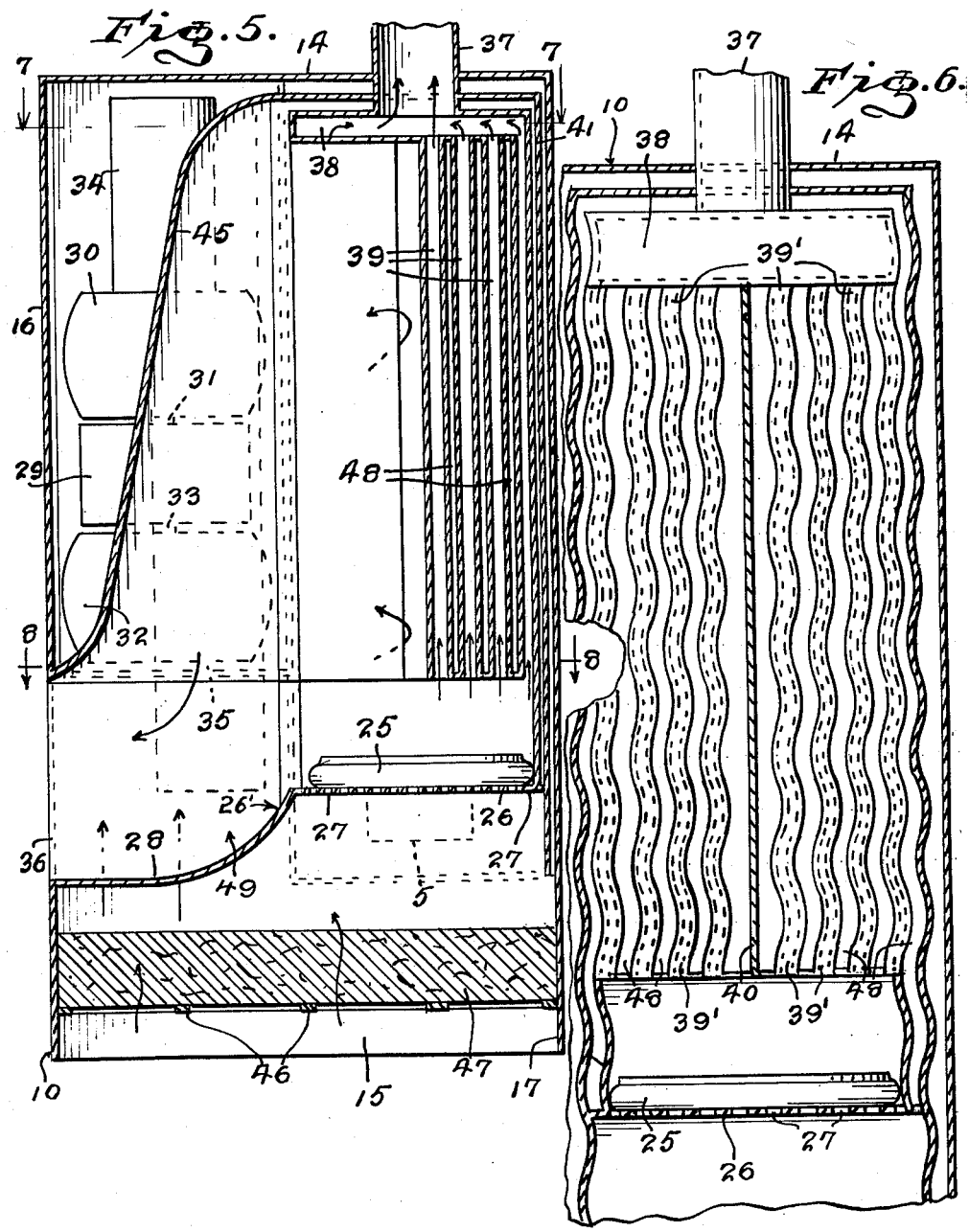

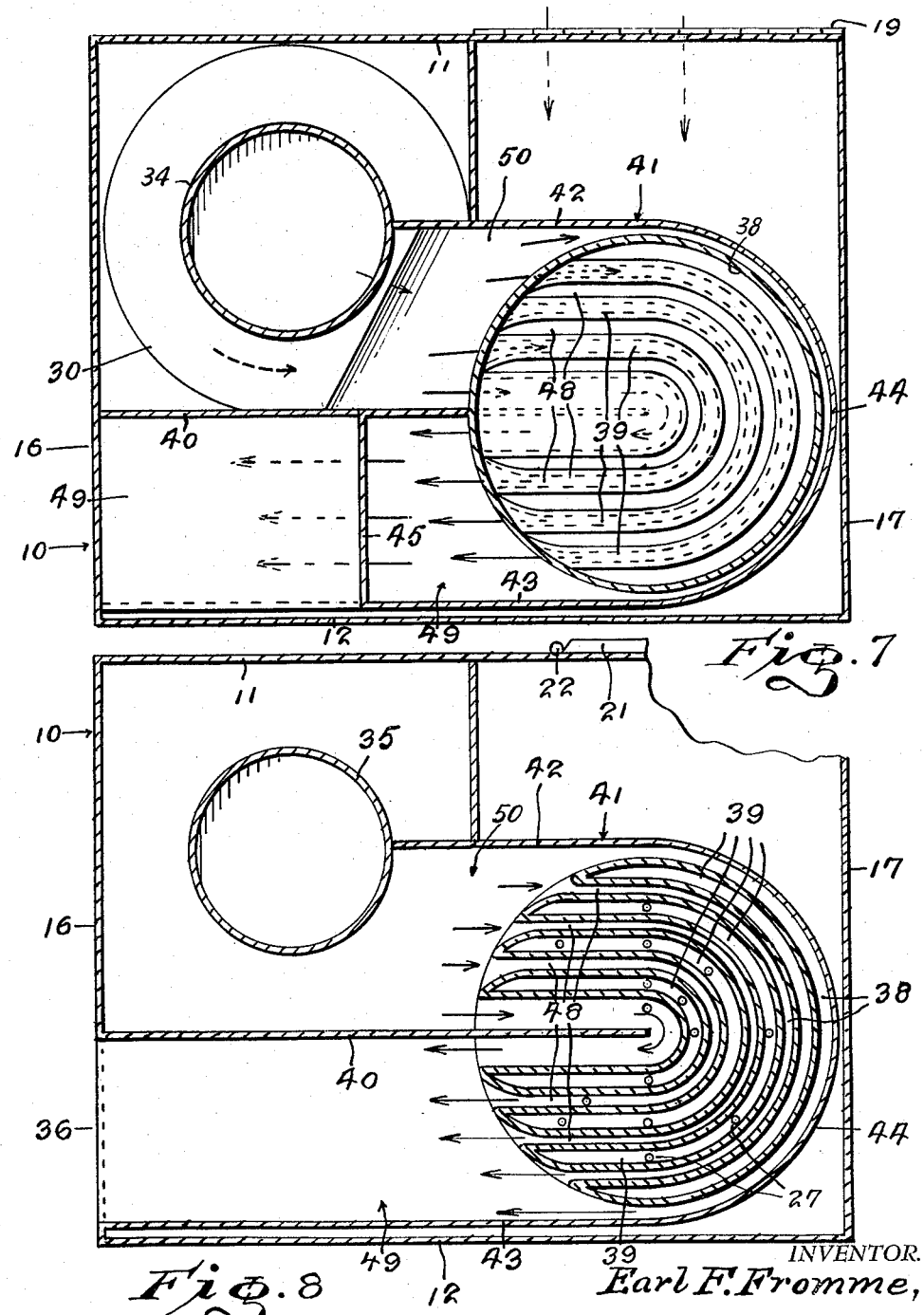

United States Patent Office 2,957,473
Patented Oct. 25, 1960

2,957,473

HEATER

Earl F. Fromme, Star Rte. #2, Jefferson City, Mo.

Original application Feb. 16, 1954, Ser. No. 410,636, now Patent No. 2,856,915, dated Oct. 21, 1958. Divided and this application Oct. 7, 1958, Ser. No. 771,932

2 Claims. (Cl. 126—110)

This invention relates to a forced air heater.

This application is a division of my co-pending application, Serial No. 410,636, filed February 16, 1954 now Patent No. 2,856,915 for a Forced Air Heater.

An object of the present invention is to provide a forced air heater which will operate with maximum efficiency and wherein there is provided air passages through which air moves or passes whereby the air can readily pick up heat from the products of combustion resulting from a heater such as a heater of the gas or oil fired type.

A still further object of the invention is the provision of a heater of this character, which is simple in its construction, thoroughly reliable and efficient in operation, possessed of maximum heating qualities, economical in fuel consumption, neat in appearance and inexpensive to manufacture.

With these and other objects in view, the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a front elevational view of the heater of the present invention.

Figure 2 is a rear elevational view of the heater.

Figure 3 is a side elevational view of the heater.

Figure 4 is a top plan view of the heater.

Figure 5 is a sectional view taken on the line 5—5 of Figure 3.

Figure 6 is a sectional view taken on the line 6—6 of Figure 4, but showing the conduits having corrugations instead of being straight or smooth.

Figure 7 is a sectional view taken on the line 7—7 of Figure 1 or Figure 5.

Figure 8 is a sectional view taken on the line 8—8 of Figure 1.

Referring in detail to the drawings, the numeral 10 designates a housing that can be made of any suitable material, and the housing 10 includes a front wall 11 and a back wall 12, Figures 1 and 2. There is further provided a horizontally disposed top wall 14, and the bottom of the housing is open as at 15. End or side walls 16 and 17 are provided, and these walls are arranged in spaced parallel relation with respect to each other. A door 18 is hingedly connected to the front wall 11 by a hinge 19, and a knob 20 is provided for swinging the door 18, as for example when access is to be gained to the interior of the housing.

A draft door 21 is hingedly connected to the front wall 11 by a hinge 22, and the door 21 can be swung open by means of a knob 23, there being a latch 24 for preventing accidental opening of this door 21. The door 21 can be used for controlling the amount of draft or air to a burner 25 which may be of conventional construction. The burner 25 can be positioned on a horizontally disposed portion 26 of a plate 26', and the horizontal portion 26 includes a plurality of apertures 27 through which air can pass to the burner 25, Figure 5. The plate 26' further includes a lower portion 28.

Positioned in the housing 10 is a pair of fans or blowers 30 and 32 which serve to force the air through the heater so that the air issuing from the housing 10 will be heated to the desired temperature and will pass to the various parts of the building to be heated. A motor 29 may be provided for operating the blowers 30 and 32, and to effect operation of these blowers, shafts 31 and 33 may extend from the motor 29 to the blowers as shown in Figure 5. A pipe 34 may extend upwardly from the blower 30, and a similar pipe 35 may extend downwardly from the blower 32. These pipes 34 and 35 serve as intake ducts and receive the air to be heated as it enters the housing through the lower open end 15, and the air is forced out the side of these blowers into a zone where it is heated to the desired temperature. An opening 36 is arranged in a side of the housing, and this opening 36 serves as a discharge or outlet means through which the heated air passes to the building or other locality. A suitable opening 5 can be arranged in the barrel or casing 41 so that air can get to the burner.

Extending through the top wall 14 of the housing is a flue or discharge pipe 37 through which passes the waste gases that are generated in the burner 25. The lower end of the flue 37 communicates with a chamber 38. Communicating with the chamber 38 are the upper ends of a plurality of vertically elongated spaced apart nested ducts of U-shape or horseshoe shape in horizontal cross section, and the ducts 39 are arranged in nesting relation with respect to each other as shown in Figures 5, 6, 7 and 8. The ducts 39 may have straight surfaces as shown in Figures 5, 7 and 8, or else the ducts may be provided with a plurality of corrugations as shown in Figure 6 and as indicated by the numeral 39'. The upper and lower ends of these ducts are open so that the hot gases from the burner 25 can enter the lower ends of the ducts and pass up the channels and the resulting products of combustion will then enter the chamber 38 and pass out through the flue 37. As the hot gases pass up these ducts, the air to be heated will be forced into the conduits 48 between these ducts as shown in Figures 7 and 8 and a partition 40 is provided for insuring that the air to be heated from the blowers 30 and 32 must pass through the conduits 48 between the ducts 39, before it can pass out through the opening 37. As the air to be heated passes through the conduits between these ducts, it will be warmed or heated since the hot gases of combustion are passing through the ducts.

The ducts 39 or 39' may be enclosed in a casing 41 that includes side members 42 and 43 which are interconnected together by an arcuate portion 44, Figure 8. An inclined closure member 45 has its lower end extending from the side wall 16 to the top of the casing 41.

Positioned in the bottom of the housing 10 adjacent the open lower end 15 is a plurality of spaced parallel braces or slats 46, and supported on the slats 46 is a filter pad 47 that can be made of any suitable material. The filter pad 47 serves to remove any impurities or foreign matter that may be present in the air entering the heater. The numeral 48 indicates the conduits between the ducts 39, and the air to be heated passes through these conduits 48, and suitable closure members may be provided for closing the tops and bottoms of these conduits 48. The horseshoe shaped conduits are made up in clusters and air from the blower goes through these conduits while heat from the burner rises up between them.

From the foregoing it is apparent that there has been provided a heater which will efficiently heat air with a minimum amount of expense. In use the air to be heated enters the housing 10 through the open lower end 15, and this air passes through the filter 47 so that all foreign matter is removed from the air. This air then enters the pipes 34 and 35 and then the blowers 30 and 32 which are operated by the motor 29 cause the air to be forced outside of the blowers into the space or chamber 50. This air then travels through the U-shaped conduits 48 between the hot horseshoe shaped spaces or channels 39 or 39'. This air then issues out of the passageways 48 into the chamber 49 and when the air reaches the chamber 49 it is in a hot condition or state. This hot air leaves the housing 10 through the opening 36. The heat is supplied by the burner 25 and air for supporting combustion in the burner may be supplied by opening the door 21. The hot gases from the burner 25 pass up through the channels 39 and the upper and lower ends of the channels 39 are open. The smoke passes from the top of the channels 39 into the chamber 38 and then out through the flue 37.

From the foregoing it is apparent that a heater has been provided which will remove all heat produced by the burner so that only smoke and gases will go out the flue. The present invention is especially directed to the gas or oil fired type of burner, but it can be used in other types and all of the heat will be removed regardless of what type of unit is used to fire the heater. Although the drawings show the air flowing through the barrel or casing in a clockwise direction, the various parts of the heater can be shifted around so that the air comes in on the other side of the barrel and air will flow through the barrel in a counter-clockwise direction. If the heater is made smaller or larger the number of units or air passages on the inside of the barrel will change and the vertical sides of the air passageways can be made concave, convex, corrugated, angular or any other shape. The barrel may be positioned in a horizontal instead of a vertical position and the heater is easy to construct and can be made in any suitable size and the number of air passages can be increased or decreased as required. The air being forced around and through the barrel has a wiping action that picks up the heat off the surface of the metal as it is collected from the heat rising from the burner and with the present invention the heater can be built very small and still deliver a tremendous amount of heat.

Minor changes in shape, size and rearrangement of details coming within the field of invention claimed may be resorted to in actual practice if desired.

I claim:

1. In a heater, a housing including vertically disposed front and back walls, first and second vertically disposed side walls extending between said front and back walls and secured thereto, a top wall on said housing, the bottom of said housing being open, a plate positioned in said housing and including a horizontally disposed portion provided with a plurality of apertures, a burner supported above said apertures on said horizontally disposed portion, a door hingedly connected to said front wall for permitting access to the interior of the housing, a casing arranged in said housing and including a pair of spaced parallel side members interconnected together by an arcuate end member, said burner being arranged in the bottom of said casing, a vertically disposed partition arranged between said side members, a plurality of vertically elongated spaced apart nesting ducts of U-shape in horizontal cross section positioned in said casing and having their lower ends arranged contiguous to said burner for receiving hot products of combustion from said burner, a pipe communicating with the upper ends of said ducts and projecting through said top wall for the discharge of smoke and gases, a pair of blowers positioned in said housing for forcing air to be heated through conduits between said ducts and through said casing, a motor for operating said blowers, there being an opening in one of said side walls for the egress therethrough of heated air.

2. A heater comprising a housing embodying front and back walls, first and second side walls extending between said front and back walls and secured thereto, a top wall on said housing, the bottom of said housing being open, a plate positioned in said housing and including a portion provided with a plurality of apertures, a burner supported above said apertures on said last named portion, a casing arranged in said housing and including a pair of side members interconnected by an end member, said burner being arranged in the bottom of said casing, a partition arranged between said side members, a plurality of vertically elongated spaced apart nesting ducts of U-shape in horizontal cross section positioned in said casing and having their lower ends arranged contiguous to said burner for receiving hot products of combustion from said burner, a pipe communicating with the upper ends of said ducts and projecting through said top wall for the discharge of smoke and gases, a pair of blowers positioned in said housing for forcing air to be heated through conduits between said ducts and through said casing, and means for operating said blowers, there being an opening in one of said side walls for the egress therethrough of heated air, means housing the burner and forming a combustion chamber which delivers hot products to the inlet ends of the ducts, means connecting outlets of the blowers to deliver air to the spaces between the ducts, and means to conduct the heated air from these last named spaces to the opening in the side wall for the egress of air.

References Cited in the file of this patent

UNITED STATES PATENTS

| | | |
|---|---|---|
| 2,290,255 | Smith | July 21, 1942 |
| 2,592,396 | Dahlstrom | Apr. 8, 1952 |
| 2,655,143 | Herbster | Oct. 13, 1953 |